United States Patent
Brush

(10) Patent No.: US 6,247,746 B1
(45) Date of Patent: Jun. 19, 2001

(54) DOOR ASSEMBLY FOR A CAB OF AN AGRICULTURAL TRACTOR

(75) Inventor: Jeffrey A. Brush, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/453,242

(22) Filed: Dec. 2, 1999

(51) Int. Cl.$^7$ ................. B60J 1/08; B60J 5/04; B60J 10/08

(52) U.S. Cl. ................. 296/190.11; 296/146.11; 296/146.2; 296/146.9; 296/148; 296/201; 296/202; 49/397

(58) Field of Search ............... 296/190.11, 146.1, 296/146.2, 146.5, 146.9, 148, 201, 202, 218, 216.02, 215, 146.11; 49/397

(56) References Cited

U.S. PATENT DOCUMENTS

| | | |
|---|---|---|
| 3,747,273 * | 7/1973 | Johnson ................. 49/394 |
| 3,802,530 | 4/1974 | Purcell et al. . |
| 3,866,969 | 2/1975 | Sandrock et al. . |
| 3,964,779 * | 6/1976 | Benson ................. 296/27 |
| 3,967,850 * | 7/1976 | Whisler ................. 296/146 |
| 4,273,378 | 6/1981 | Kramer . |
| 4,335,911 * | 6/1982 | Taylor ................. 292/262 |
| 4,339,844 * | 7/1982 | Shatters ................. 16/82 |
| 4,370,829 * | 2/1983 | Wagner ................. 49/388 |
| 4,416,486 | 11/1983 | McNaught et al. . |
| 4,443,035 * | 4/1984 | Saemann ................. 296/190 |
| 4,605,259 | 8/1986 | Hurlburt . |
| 4,609,216 * | 9/1986 | Baker et al. ................. 292/262 |
| 4,652,043 | 3/1987 | Hurlburt . |
| 4,738,329 | 4/1988 | Gauer . |
| 4,743,062 | 5/1988 | McLaren et al. . |
| 4,772,065 | 9/1988 | Nakata et al. . |
| 4,832,384 * | 5/1989 | Venable ................. 292/87 |
| 4,850,636 | 7/1989 | McLaren et al. . |
| 4,940,280 * | 7/1990 | Templeton ................. 296/190 |
| 5,076,637 | 12/1991 | Larkin et al. . |
| 5,125,716 | 6/1992 | Smith et al. . |
| 5,408,785 | 4/1995 | Heim et al. . |

\* cited by examiner

Primary Examiner—Joseph D. Pape
Assistant Examiner—Greg Blankenship
(74) Attorney, Agent, or Firm—Maginot, Addison & Moore; Jeff A. Greene

(57) ABSTRACT

An agricultural tractor includes a cab frame having structural support post. The tractor also includes a hinge member having a first end portion which is pivotally coupled to the structural support post of the cab frame, and a second end portion which is opposite the first end portion. The tractor further includes a support arm secured to the second end portion of the hinge member in a substantially horizontal orientation. The support arm has a mounting boss secured thereto. The tractor further includes a window panel having a mounting aperture defined therein. The tractor further includes a fastener that is received through the mounting aperture so as to engage the mounting boss thereby securing the window panel to the support arm. Such a configuration allows for replacement of the window panel in the event of breakage thereof without the need to remove the hinge member from the structural support of the cab.

20 Claims, 5 Drawing Sheets

DOOR ASSEMBLY FOR A CAB OF AN AGRICULTURAL TRACTOR

TECHNICAL FIELD OF THE INVENTION

The present invention relates generally to an agricultural tractor, and more particularly to a door assembly for the cab of an agricultural tractor.

BACKGROUND OF THE INVENTION

Agricultural work machines such as tractors typically include a cab for enclosing the operator's seat, controls, and the like. Heretofore designed tractor cabs typically include a metal frame which has a number of glass window panels secured thereto for allowing the operator to see out of the cab in many different directions during operation of the tractor. The metal frame generally includes a pivoting subframe which, along with the glass window panels secured thereto, functions as a door assembly which allows the operator to enter and exit the cab.

However, heretofore designed tractor cab configurations have a number of drawbacks associated therewith. For example, the glass window panels associated with the cab are often very difficult to replace in the event one of the window panels is broken or otherwise damaged during operation of the tractor. Of particular concern is the window panel mounting configuration of heretofore designed cab door assemblies. For instance, one window mounting configuration which has been utilized is to sandwich the glass window panel between an external hinge and an internal window frame. However, should the glass window panel need replacing due to, for example, damage to the window, the entire door assembly must be removed from the tractor so that the window panel can be removed from between the hinge and the window frame. Such a need for the removal of the entire door assembly undesirably increases the duration and complexity of the repair procedure.

Moreover, other window mounting configurations have sandwiched the glass window panel between opposite halves of a generally rectangular-shaped window frame assembly. As with the design previously discussed, the entire door assembly must be removed in order to replace the glass window panel in the event the window panel needs replacing.

What is needed therefore is a door assembly for a cab of an agricultural tractor which overcomes one or more of the above-mentioned drawbacks. What is particularly needed is a door assembly for a cab of an agricultural tractor which has a glass window panel that can be quickly and easily replaced without the need to remove the entire door assembly.

DISCLOSURE OF THE INVENTION

In accordance with a first embodiment of the present invention, there is provided a door assembly for a cab of a work machine. The door assembly includes a hinge member having a first end portion which is adapted to be pivotally coupled to a structural support of the cab of the work machine, and a second end portion which is opposite the first end portion. The door assembly also includes a support arm secured to the second end portion of the hinge member in a substantially horizontal orientation. The support arm has a mounting boss secured thereto. Furthermore, the door assembly includes a window panel having a mounting aperture defined therein. The door assembly further includes a fastener that is received through the mounting aperture so as to engage the mounting boss thereby securing the window panel to the support arm.

In accordance with a second embodiment of the present invention, there is provided a door assembly for a cab of a work machine. The door assembly includes a hinge member having a first end portion which is adapted to be pivotally coupled to a structural support of the cab of the work machine, and a second end portion which is opposite the first end portion. The door assembly also includes a support arm disposed in a substantially horizontal orientation. The door assembly further includes a vertical support member having a first side and a second side. The second end portion of the hinge member is secured to the first side of the vertical support member. The support arm is secured to the second side of the vertical support member. The door assembly further includes a window panel secured to the support arm.

In accordance with a third embodiment of the present invention, there is provided a work machine. The work machine includes a cab frame having a structural support post. The work machine also includes a hinge member having a first end portion which is pivotally coupled to the structural support post of the cab frame, and a second end portion which is opposite the first end portion. The work machine further includes a support arm secured to the second end portion of the hinge member in a substantially horizontal orientation. The support arm has a mounting boss secured thereto. The work machine further includes a window panel having a mounting aperture defined therein. Moreover, the work machine includes a fastener that is received through the mounting aperture so as to engage the mounting boss thereby securing the window panel to the support arm.

BEST MODE FOR CARRYING OUT THE INVENTION

Figure 1:
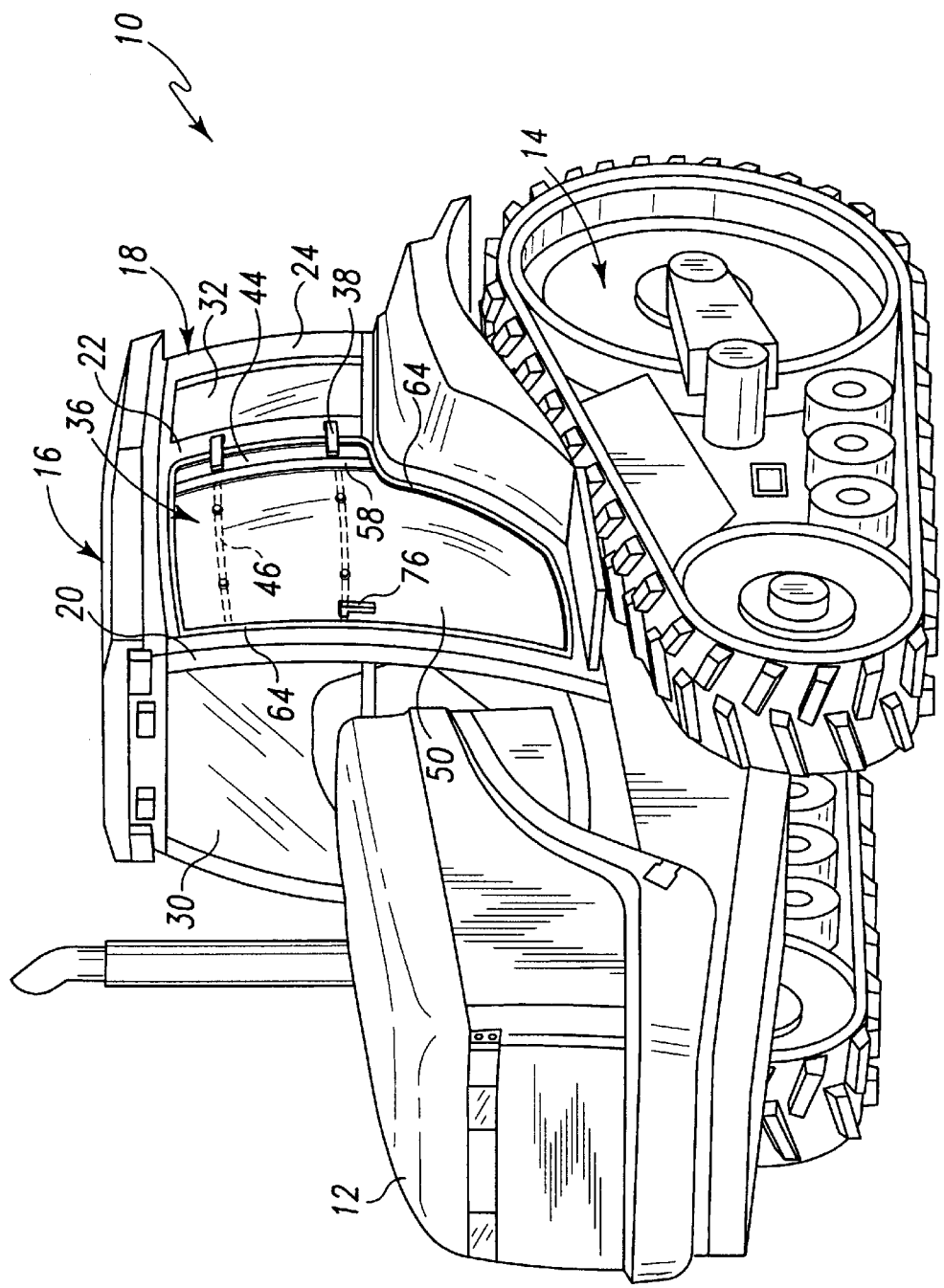
FIG. 1 is a perspective view of an agricultural tractor which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a work machine such as an agricultural tractor 10. The tractor 10 is utilized to perform numerous work functions such as the pulling of plows and planters in an agricultural operation. The tractor 10 includes a body 12 and an undercarriage drive assembly 14. The undercarriage drive assembly 14 provides the motive power for moving the tractor 10.

The tractor 10 also includes a cab 16. The cab 16 includes a frame assembly 18 having a forward or A-post 20, a middle or B-post 22, and a rearward or C-post 24. The cab 16 is provided to enclose or otherwise house the components associated with the tractor 10 which are utilized by the operator such as a seat (not shown) and a control assembly which includes, for example, a steering wheel and foot pedal assembly (not shown). Secured to the frame assembly 18 is a number of glass window panels such as a forward window or windshield 30, a pair of side windows 32, and a rear window (not shown).

The cab 16 also includes a number of door assemblies 36. The door assemblies 36 are shown in greater detail in FIGS. 2–5. Each of the door assemblies 36 includes a hinge member 38 that has a first end portion that is pivotally coupled to the B-post 22 of the cab frame 18 by use of a pin joint 40. In such a manner, the door assembly 36 may be selectively opened and closed in order to provide an ingress and egress for the operator into and out of the cab 16.

Figure 2:
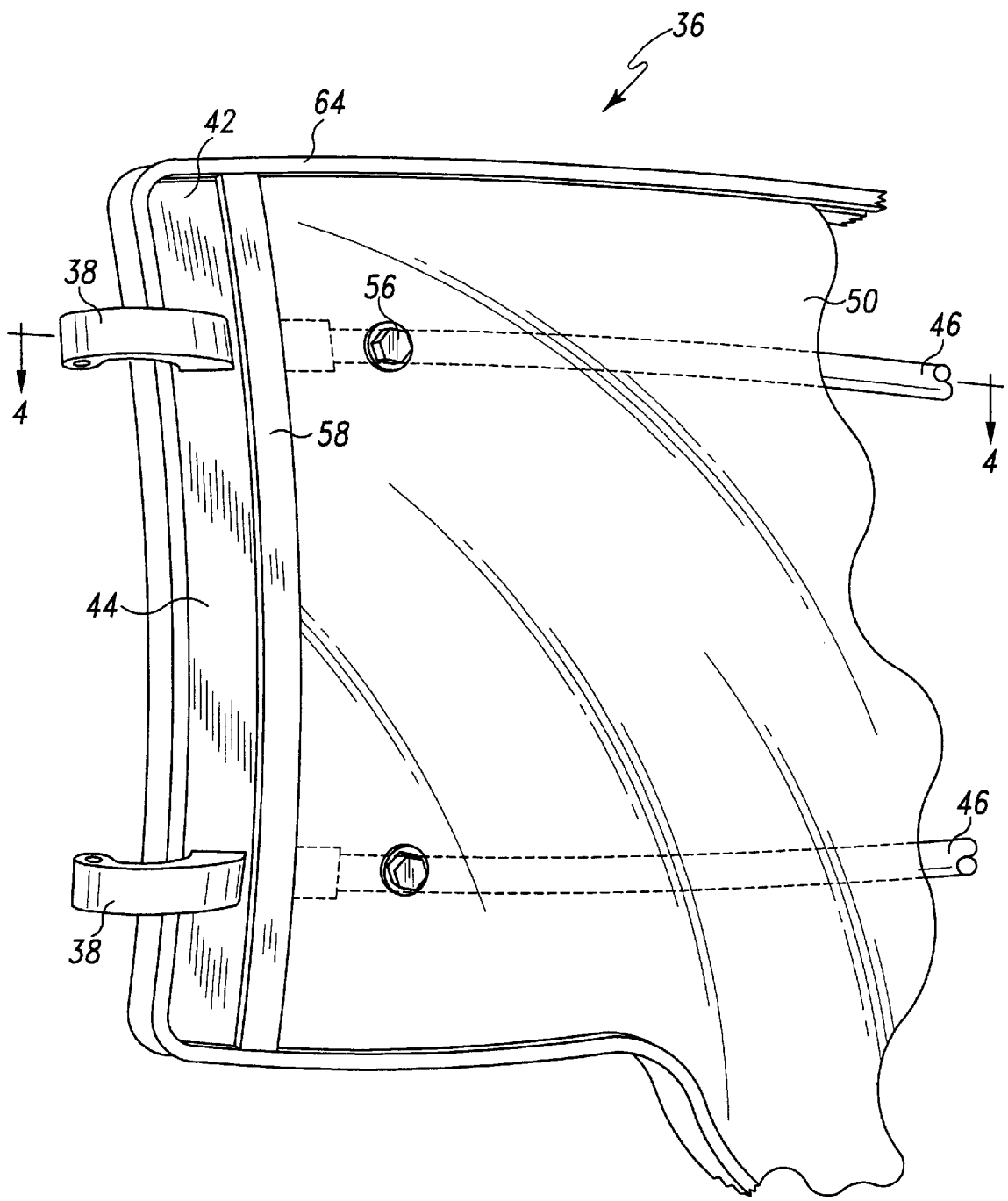
FIG. 2 is an enlarged side elevational view of the door assembly of the tractor of FIG. 1, as viewed from the outside of the tractor.
Figure 3:
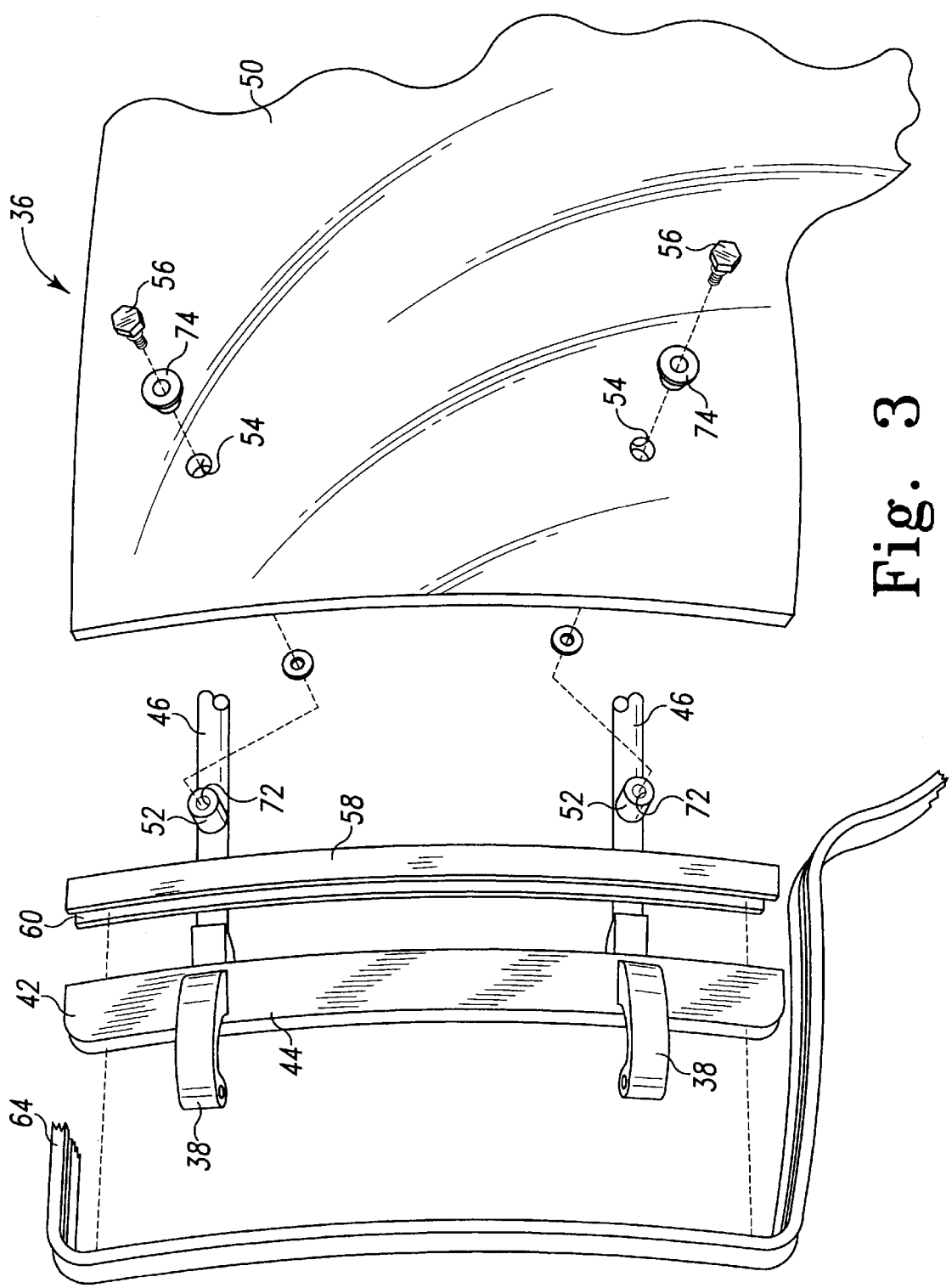
FIG. 3 is an exploded view of the door assembly of FIG. 2.

As shown in FIGS. 2 and 3, a second end portion of the hinge member 38 is welded or otherwise secured to an exterior side 42 of a vertical support member 44. The vertical support member 44 provides mechanical support and rigidity for the components associated with the door assembly 36. The vertical support member 44 is preferably constructed of a relatively rigid material such as metal.

A number of support arms 46 are welded or otherwise secured to an interior side 48 of the vertical support member 44. The support arms 46 are provided to support a glass window panel 50. In particular, each of the support arms 46 is disposed in a substantially horizontal orientation and is configured to extend substantially across the entire width of the glass window panel 50. As with the vertical support member 44, the support arms 46 are preferably constructed of a relatively rigid material such as metal.

Figure 4:
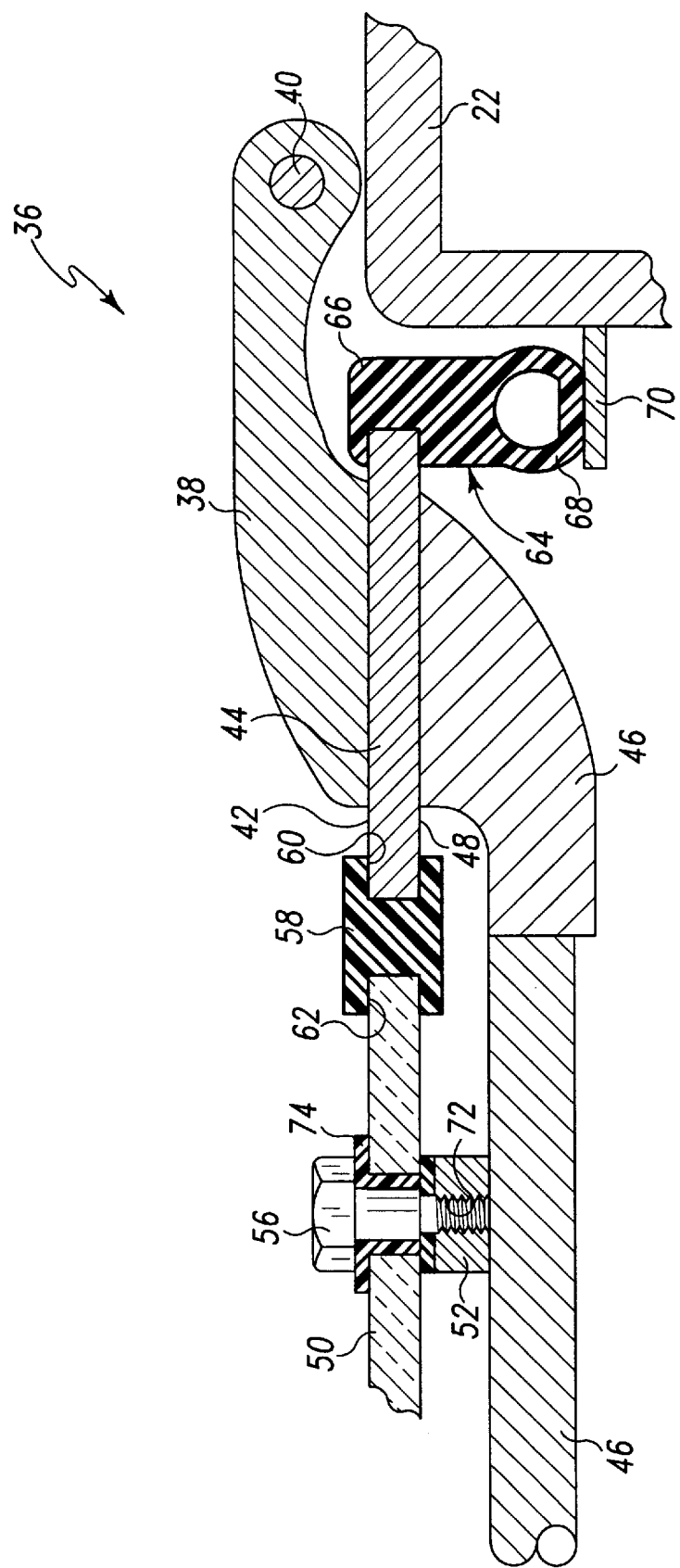
FIG. 4 is an enlarged fragmentary cross sectional view taken along the line 4—4 of FIG. 2, as viewed in the direction of the arrows.

Moreover, each of the support arms 46 has a number of mounting bosses 52 secured thereto. The mounting bosses 52 are aligned with a number of corresponding mounting apertures 54 defined in the window panel 50. A rubber coated fastener such as a screw 56 is received through the mounting apertures 54 of the window panel 50 and thereafter threadingly engaged into an internally threaded bore 72 defined in each of the mounting bosses 52 (see FIG. 4) so as to secure the window panel 50 to the support arms 46. A reinforcing structure such as a rubber grommet 74 is preferably inserted into each of the mounting apertures 54 of the window panel 50. As shown in FIG. 4, the screws 56 are advanced through the central bore of the grommets 74 prior to engagement with the threaded bores 72 of the mounting bosses 52.

In order to seal the glass window panel 50 to the vertical support member 44, the door assembly also includes an elastomeric sealing member 58 which is interposed between the vertical support member 44 and the glass window panel 50. In particular, as shown in FIG. 4, the sealing member 58 is substantially I-shaped in cross section and has a pair of receiving grooves 60, 62 defined therein. An edge portion of the vertical support member 44 is received into the receiving groove 60, whereas an edge portion of the glass window panel 50 is received into the receiving groove 62. In such a manner, the junction between the vertical support member 44 and the glass window panel 50 is sealed thereby reducing the ingress of moisture, dust, and the like into the interior of the cab 16.

The door assembly 36 also includes an elastomeric sealing ring 64. As shown in FIG. 4, the sealing ring 64 includes an attachment portion 66 and a sealing portion 68. The attachment portion 66 is generally C-shaped and is configured to attach to the outer periphery of the vertical support member 44, the sealing member 58, and the glass window panel 50. The sealing portion 68 is generally bulbous in shape and is provided to form a seal between the components associated with the door assembly 36 (e.g. the vertical support member 44 and the glass window panel 50) and the frame assembly 18. For example, as shown in FIG. 4, the sealing portion 68 of the sealing ring 64 creates a seal between the vertical support member 44 and a sealing flange 70 associated with the B-post 22. It should be appreciated that the sealing ring 64 also forms a similar type seal with other components associated with the frame assembly 18 such as the A-post 20 and the horizontal roof supports (not shown).

Figure 5:
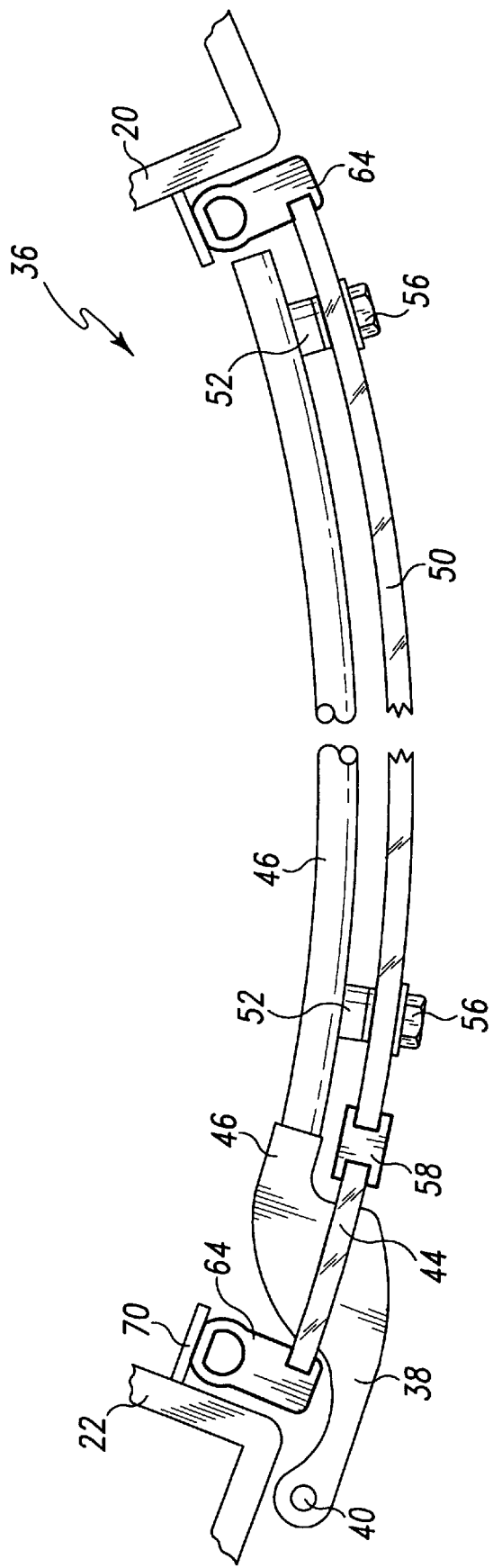
FIG. 5 is a top elevational view of the door assembly of FIGS. 2–3.

It should be noted that the configuration of the door assembly 36 increases the usable area within the interior of the cab 16. In particular, as shown in FIG. 5, both the support arms 46 and the glass window panel 50 are bowed in shape in an outward direction relative to the interior of the cab 16. Such a bowed shape increases the size of the interior of the cab 16.

Moreover, as shown in FIG. 5, the support arms 46 extend across the entire distance between the A-post 20 and the B-post 22. Such a configuration allows a latching mechanism 76 (see FIG. 1) to be secured to one of the support arms 46 so as to latch the support arm 46 and hence the door assembly 36 to the A-post 20 when the door assembly 36 is in its closed position.

In addition, such a configuration also facilitates manufacture of the tractor 10. In particular, during manufacture of the tractor 10, a sub-assembly consisting of the hinge members 38, the vertical support member 44, the sealing member 58, and the support arms 46 may be secured to the frame assembly 18 without the glass window panels 50 being installed. In such a manner, the position and fit of the sub-assembly can be adjusted to produce a desired fit prior to installation of the glass window panels 50 thereby facilitating manufacture of the tractor 10.

It should be appreciated that the door assembly 36 of the present invention has numerous advantages over door assemblies which have heretofore been designed. For example, by securing the glass window panels 50 to the support arms 46, the glass window panels 50 are not subjected to mechanical loads as the body 12 of the tractor is torqued, twisted, or otherwise stressed during operation of the tractor 10.

Moreover, as described above, during manufacture of the tractor 10, the door assembly 36 of the present invention may be secured to the frame assembly 18 of the cab prior to installation of the glass window panels 50. Such a feature facilitates manufacture of the tractor 10 and also reduces the number of occasions that one of the glass window panels 50 is broken during manufacture of the tractor 10.

In addition, the glass window panels 50 may be quickly and easily replaced in the event one of the window panels is broken. More specifically, in order to replace the glass window panels 50, the screws 56 are first removed from engagement with the bosses 52 such that the broken glass window panel 50 may be lifted away from the support arms 46. Thereafter, a replacement glass window panel 50 is installed by securing the replacement window panel 50 to the support arms 46 by use of the screws 56.

INDUSTRIAL APPLICABILITY

In operation, during initial manufacture of the tractor 10, the door assembly may be secured and fitted to the frame 18 prior to installation of the window panels 50. In particular, as described above, a sub-assembly consisting of the hinge members 38, the vertical support member 44, the sealing member 58, and the support arms 46 may be secured to the frame assembly 18 without the glass window panels 50 being installed (i.e. without the glass window panels 50 being secured to the support arms 46). In such a manner, the position and fit of the sub-assembly can be adjusted to produce a desired fit prior to installation of the glass window panels 50 thereby facilitating manufacture of the tractor 10.

During subsequent operation of the tractor 10, should one of the glass window panels 50 be broken by debris or the like, the window panel 50 may be quickly and easily replaced without the need to remove the entire door assembly 36 from the cab frame assembly 18. In particular, the screws 56 are first removed from threading engagement with the bosses 52 and thereafter advanced out of the mounting apertures 54 of the glass window panel 50 such that the broken window panel 50 may be lifted or otherwise removed from the support arms 46.

Thereafter, a replacement glass window panel 50 is positioned in contact with the support arms 46 such that the mounting apertures 54 are aligned with the threaded bores 72 of the mounting bosses 52. Once the replacement window panel 50 has been positioned in such a manner, the screws 56 are advanced so as to be received through the mounting apertures 54 and thereafter threadingly engaged into the threaded bores 72 of the mounting bosses 52 thereby securing the replacement window panel 50 to the support arms 46.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the work machine described herein. It will be noted that alternative embodiments of the work machine of the present invention may not include all of the features described yet still benefit from at least some of the advantages of such features. Those of ordinary skill in the art may readily devise their own implementations of the work machine that incorporate one or more of the features of the present invention and fall within the spirit and scope of the present invention as defined by the appended claims.

What is claimed is:

1. A door assembly for a cab of a work machine, comprising:
    a hinge member having a first end portion which is adapted to be pivotally coupled to a structural support of said cab of said work machine, and a second end portion which is opposite said first end portion;
    a support arm secured to said second end portion of said hinge member in a substantially horizontal orientation, said support arm having a mounting boss secured thereto;
    a window panel having a mounting aperture defined therein; and
    a fastener received through said mounting aperture so as to engage said mounting boss thereby securing said window panel to said support arm.

2. The door assembly of claim 1, further comprising a vertical support member having an interior side and an exterior side, wherein:
    said second end portion of said hinge member is secured to said exterior side of said vertical support member, and
    said support arm is secured to said interior side of said vertical support member.

3. The door assembly of claim 2, further comprising an elastomeric sealing member, wherein said elastomeric sealing member is interposed between said vertical support member and said window panel.

4. The door assembly of claim 4 further comprising an elastomeric sealing ring, wherein said elastomeric sealing ring is secured around the periphery of said window panel, said vertical support member, and said elastomeric sealing member.

5. The door assembly of claim 1, wherein both said support arm and said window panel possess a bowed shape.

6. The door assembly of claim 1, wherein said window panel possesses an interior surface and an exterior surface, both said support arm and said window panel are bowed outwardly towards the exterior surface.

7. The door assembly of claim 1, wherein:
    said support arm is constructed of metal, and
    said window panel is constructed of glass.

8. A door assembly for a cab of a work machine, comprising:
    a hinge member having a first end portion which is adapted to be pivotally coupled to a structural support of said cab of said work machine, and a second end portion which is opposite said first end portion;
    a support arm disposed in a substantially horizontal orientation;
    a vertical support member having a first side and a second side with said second end portion of said hinge member being secured to said first side of said vertical support member, and said support arm being cantileveredly secured to said second side of said vertical support member; and
    a window panel secured to said support arm.

9. The door assembly of claim 8, further comprising a fastener wherein:
    said support arm has a mounting boss secured thereto,
    said window panel has a mounting aperture defined therein, and
    said fastener is received through said mounting aperture so as to engage said mounting boss thereby securing said window panel to said support arm.

10. The door assembly of claim 8, wherein:
    said first side of said vertical support member includes an exterior side of said vertical support member, and
    said second side of said vertical support member includes an interior side of said vertical support member.

11. The door assembly of claim 8, further comprising an elastomeric sealing member, wherein said elastomeric sealing member is interposed between said vertical support member and said window panel.

12. The door assembly of claim 11 further comprising an elastomeric sealing ring, wherein said elastomeric sealing ring is secured around the periphery of said window panel, said vertical support member, and said elastomeric sealing member.

13. The door assembly of claim 8, wherein said window panel possesses a bowed shape.

14. The door assembly of claim 8, wherein said window panel possesses an interior surface and an exterior surface, both said support arm and said window panel are bowed outwardly towards the exterior surface.

15. The door assembly of claim 8, wherein:

said vertical support member and said support arm are each constructed of metal, and said window panel is constructed of glass.

16. A work machine, comprising:

a cab frame having a structural support post;

a hinge member having a first end portion which is pivotally coupled to said structural support post of said cab frame, and a second end portion which is opposite said first end portion;

a support arm secured to said second end portion of said hinge member in a substantially horizontal orientation, said support arm having a mounting boss secured thereto;

a window panel having a mounting aperture defined therein; and a fastener received through said mounting aperture so as to engage said mounting boss thereby securing said window panel to said support arm.

17. The work machine of claim 16, further comprising a vertical support member having an interior side and an exterior side, wherein:

said second end portion of said hinge member is secured to said exterior side of said vertical support member, and said support arm is secured to said interior side of said vertical support member.

18. The work machine of claim 17, further comprising an elastomeric sealing member, wherein said elastomeric sealing member is interposed between said vertical support member and said window panel.

19. The work machine of claim 18 further comprising an elastomeric sealing ring, wherein said elastomeric sealing ring is secured around the periphery of said window panel, said vertical support member, and said elastomeric sealing member so as to seal said window panel, said vertical support member, and said elastomeric sealing member to said cab frame.

20. The work machine of claim 8, wherein both said support arm and said window panel possess a bowed shape.

* * * * *